US011438666B2

(12) United States Patent
Sarkic et al.

(10) Patent No.: US 11,438,666 B2
(45) Date of Patent: *Sep. 6, 2022

(54) SOCIAL NETWORK ACCOUNT ASSISTED SERVICE REGISTRATION

(71) Applicant: Sonos, Inc., Santa Barbara, CA (US)

(72) Inventors: Andrej Sarkic, Cambridge, MA (US); Danielle Storlie, Santa Barbara, CA (US); Diane Roberts, Santa Barbara, CA (US); Ron Kuper, Arlington, MA (US); Dayn Wilberding, Santa Barbara, CA (US); Carl Fristrom, Watertown, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/072,920

(22) Filed: Oct. 16, 2020

(65) Prior Publication Data

US 2021/0037077 A1 Feb. 4, 2021

Related U.S. Application Data

(63) Continuation of application No. 16/723,708, filed on Dec. 20, 2019, now Pat. No. 10,841,351, which is a
(Continued)

(51) Int. Cl.
*H04N 21/4782* (2011.01)
*G06F 12/0806* (2016.01)
(Continued)

(52) U.S. Cl.
CPC ..... *H04N 21/4782* (2013.01); *G06F 12/0806* (2013.01); *G06F 16/24568* (2019.01);
(Continued)

(58) Field of Classification Search
CPC .. G06F 3/04842; G06F 3/04847; G06F 3/165; G06F 3/0481; G06F 16/43;
(Continued)

(56) References Cited

U.S. PATENT DOCUMENTS 5,440,644 A  8/1995 Farinelli et al.
5,761,320 A  6/1998 Farinelli et al.
(Continued)

FOREIGN PATENT DOCUMENTS

EP     1389853 A1    2/2004
WO     200153994     7/2001
WO     2003093950 A2  11/2003

OTHER PUBLICATIONS

Anonymous: "Solved: How to login to spotify without using facebook—The Spotify Community", Feb. 24, 2015, XP055460214, Retrieved from the Internet: URL:http://community.spotify.com/t5/Accounts/How-to-login-to-sptify-without-using-facebook/td-p/1033575, 4 pages.
(Continued)

*Primary Examiner* — Kyung H Shin
(74) *Attorney, Agent, or Firm* — Akerman LLP

(57) ABSTRACT

Examples involve a control device using a social networking service to facilitate registration of a streaming media service with a media playback system. An example implementation receives (i) data indicating login credentials for a given account of a social networking service, and (ii) input data to configure streaming media services with a media playback system. Based on receiving the input data to configure the media playback system, the implementation queries the social networking service for streaming media services associated with the given account, and in response to the query, receives data indicating a first streaming media service associated with the given account. The implementation configures the media playback system to playback audio
(Continued)

content from the first streaming media service that is associated with the given account and causes the media playback system to playback audio content from the first streaming media service.

20 Claims, 7 Drawing Sheets

Related U.S. Application Data continuation of application No. 16/428,475, filed on May 31, 2019, now Pat. No. 10,567,456, which is a continuation of application No. 15/725,378, filed on Oct. 5, 2017, now Pat. No. 10,313,409, which is a continuation of application No. 14/694,673, filed on Apr. 23, 2015, now Pat. No. 9,787,739.

(51) Int. Cl.

| | |
|---|---|
| H04L 65/612 | (2022.01) |
| H04N 21/436 | (2011.01) |
| H04W 4/21 | (2018.01) |
| G06F 16/2455 | (2019.01) |
| G06Q 30/06 | (2012.01) |
| G06Q 50/00 | (2012.01) |
| H04L 65/1101 | (2022.01) |
| H04N 21/439 | (2011.01) |
| H04N 21/4788 | (2011.01) |
| H04L 65/60 | (2022.01) |

(52) U.S. Cl.
CPC ......... *G06Q 30/0601* (2013.01); *G06Q 50/01* (2013.01); *H04L 29/06027* (2013.01); *H04L 65/4084* (2013.01); *H04L 65/60* (2013.01); *H04N 21/439* (2013.01); *H04N 21/43615* (2013.01); *H04N 21/4788* (2013.01); *H04W 4/21* (2018.02)

(58) Field of Classification Search
CPC ........... G11B 19/025; H04N 21/43615; H04N 21/8586; H04N 21/64322; H04N 21/47202; H04N 21/6587; H04N 21/439; H04N 21/4852; H04N 21/6581; H04N 21/6125; H04N 21/8113; H04N 21/4333; H04N 21/43076; H04N 21/4788; H04N 21/4828; H04N 21/4782; H04N 21/2743; H04R 3/12; H04L 29/06027; H04L 65/4084; H04L 67/02; G06Q 10/10; G06Q 50/01
See application file for complete search history.

(56) References Cited

U.S. PATENT DOCUMENTS

| | | | |
|---|---|---|---|
| 5,923,902 A | 7/1999 | Inagaki | |
| 6,032,202 A | 2/2000 | Lea et al. | |
| 6,256,554 B1 | 7/2001 | Dilorenzo | |
| 6,404,811 B1 | 6/2002 | Cvetko et al. | |
| 6,469,633 B1 | 10/2002 | Wachter et al. | |
| 6,522,886 B1 | 2/2003 | Youngs et al. | |
| 6,611,537 B1 | 8/2003 | Edens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,295,548 B2 | 11/2007 | Blank et al. | |
| 7,391,791 B2 | 6/2008 | Balassanian et al. | |
| 7,483,538 B2 | 1/2009 | McCarty et al. | |
| 7,571,014 B1 | 8/2009 | Lambourne et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,853,341 B2 | 12/2010 | McCarty et al. | |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | McCarty et al. | |
| 8,234,395 B2 | 7/2012 | Millington | |
| 8,483,853 B1 | 7/2013 | Lambourne | |
| 8,910,265 B2 | 12/2014 | Lang et al. | |
| 8,942,252 B2 | 1/2015 | Balassanian et al. | |
| 9,654,821 B2 | 5/2017 | Coburn, IV et al. | |
| 9,665,339 B2 | 5/2017 | Reimann et al. | |
| 9,667,679 B2 | 5/2017 | Lang et al. | |
| 9,690,540 B2 | 6/2017 | Corbin et al. | |
| 9,723,038 B2 | 8/2017 | Corbin et al. | |
| 9,860,286 B2 | 1/2018 | Kumar et al. | |
| 9,874,997 B2 | 1/2018 | Clayton et al. | |
| 9,959,087 B2 | 5/2018 | Corbin et al. | |
| 10,645,130 B2 | 5/2020 | Corbin et al. | |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0157951 A1 | 8/2003 | Hasty | |
| 2004/0024478 A1 | 2/2004 | Hans et al. | |
| 2007/0142944 A1 | 6/2007 | Goldberg et al. | |
| 2013/0110929 A1* | 5/2013 | Gundotra | H04N 21/4782 709/204 |
| 2013/0174204 A1* | 7/2013 | Coburn, IV | H04L 29/06027 725/81 |
| 2014/0096219 A1 | 4/2014 | Lang et al. | |
| 2014/0213227 A1 | 7/2014 | Rao | |
| 2014/0223099 A1 | 8/2014 | Kidron | |
| 2015/0220498 A1 | 8/2015 | Munoz et al. | |
| 2015/0356084 A1 | 12/2015 | Stephenson | |

OTHER PUBLICATIONS

Anonymous: "Solved: Spotify log in through Sonos—The Spotify Community", Feb. 25, 2012, XP055460216, Retrieved from the Internet: URL:http://community.spotify.com/t5/Other-Partners-Web-Play-etc/Spotify-log-in-through-Sonos/td-p/8123, 6 pages.
Anonymous: "Spotify bei Facebook Anmeldung Willkommen in der Community", Jan. 1, 2012, XP055460213, Retrieved from the Internet: URL:http://de.community.sonos.com/installation-und-nutzung-223378/spotify-bei-facebook-anmeldung-28347, 6 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, Office Action dated Mar. 27, 2018, issued in connection with European Application No. 16719688.0, 8 pages.
European Patent Office, Summons to Attend Oral Proceedings mailed on Jul. 2, 2020, issued in connection with European Application No. 16719688.0, 11 pages.
First Action Interview Pilot Program Pre-Interview Communication dated Apr. 11, 2017, issued in connection with U.S. Appl. No. 14/694,673, filed Apr. 23, 2015, 8 pages.
International Searching Authority, International Search Report and Written Opinion dated Jul. 1, 2016, issued in connection with International Application No. PCT/US2016/028453, filed on Apr. 20, 2016, 11 pages.

(56) References Cited

OTHER PUBLICATIONS

Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Aug. 3, 2018, issued in connection with U.S. Appl. No. 15/725,378, filed Oct. 5, 2017, 16 pages.
Notice of Allowance dated Jul. 10, 2020, issued in connection with U.S. Appl. No. 16/723,708, filed Dec. 20, 2019, 5 pages.
Notice of Allowance dated Jan. 16, 2019, issued in connection with U.S. Appl. No. 15/725,378, filed Oct. 5, 2017, 5 pages.
Notice of Allowance dated Sep. 18, 2019, issued in connection with U.S. Appl. No. 16/428,475, filed May 31, 2019, 7 pages.
Notice of Allowance dated Jul. 6, 2017, issued in connection with U.S. Appl. No. 14/694,673, filed Apr. 23, 2015, 5 pages.
Palm, Inc., "Handbook for the Palm VII Handheld," May 2000, 311 pages.
Preinterview First Office Action dated Jan. 5, 2017, issued in connection with U.S. Appl. No. 14/694,673, filed Apr. 23, 2015, 5 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
International Bureau, International Preliminary Report on Patentability and Written Opinion, dated Oct. 24, 2017, issued in connection with International Application No. PCT/US2016/028453, filed on Apr. 20, 2016, 7 pages.

\* cited by examiner

SOCIAL NETWORK ACCOUNT ASSISTED SERVICE REGISTRATION

CROSS REFERENCE TO RELATED APPLICATIONS

This application claims priority under 35 U.S.C. § 120 to, and is a continuation of, U.S. non-provisional patent application Ser. No. 16/723,708, filed Dec. 20, 2019, entitled "Social Network Account Assisted Service Registration." The Ser. No. 16/723,708 application is a continuation of, U.S. non-provisional patent application Ser. No. 16/428,475, filed May 31, 2019, entitled "Social Network Account Assisted Service Registration." The Ser. No. 16/428,475 application is a continuation of, U.S. non-provisional patent application Ser. No. 15/725,378, filed on Oct. 5, 2017, entitled "Social Network Account Assisted Service Registration." The Ser. No. 15/725,378 application is a continuation of, U.S. non-provisional patent application Ser. No. 14/694,673, filed on Apr. 23, 2015, entitled "Social Network Account Assisted Service Registration." The entire contents of the Ser. Nos. 16/428,475, 15/725,378 and 14/694,673 applications are incorporated herein by reference for all purposes.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
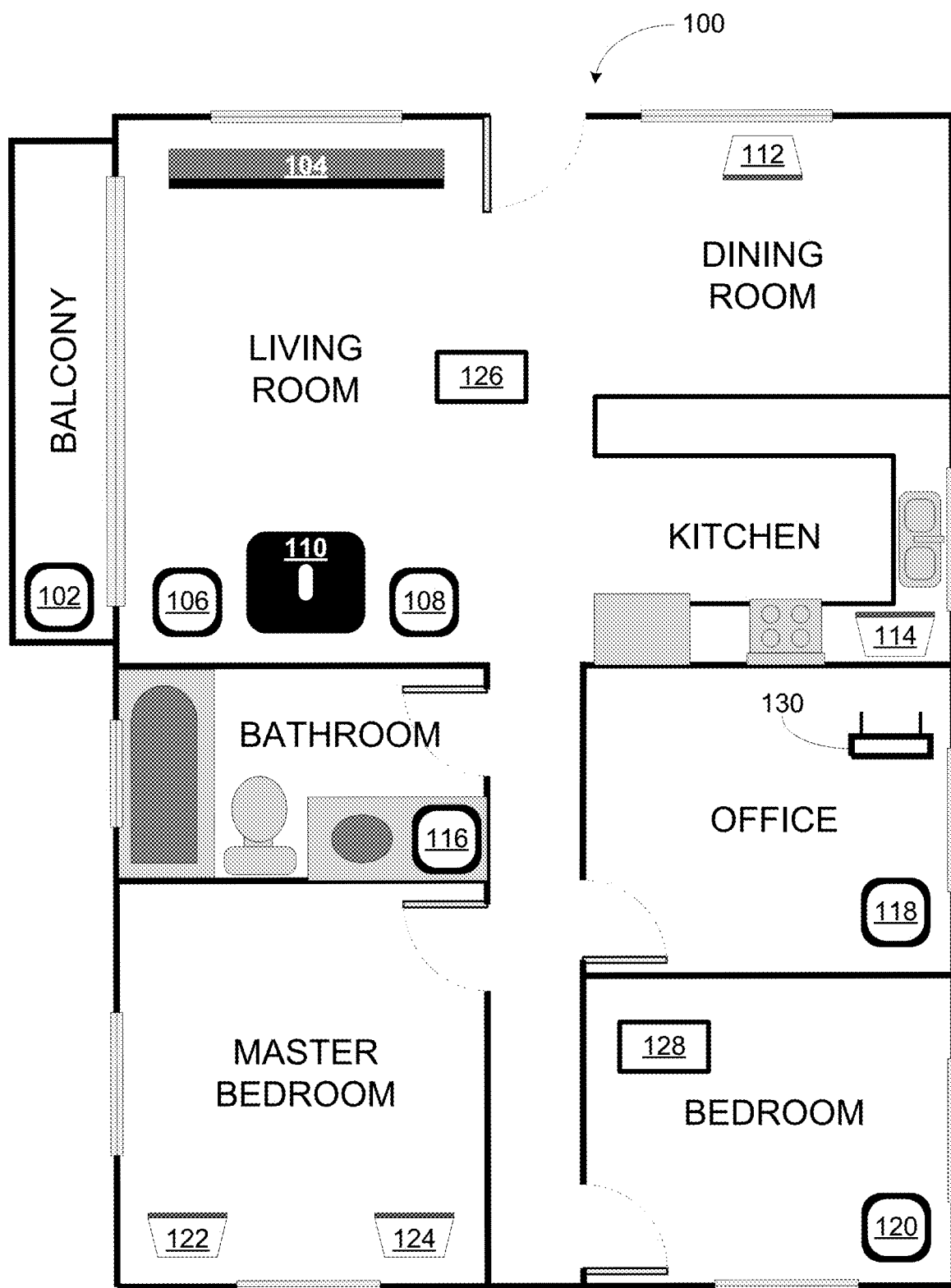
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Embodiments described herein may involve, inter alia, using a social networking account to facilitate the registration of one or more streaming media services with a media playback system. A media playback system may include one or more playback devices that support playback of media from streaming media services, such as SPOTIFY®, PANDORA®, or BEATSAUDIO®, among others. Some streaming media services may restrict access of their content to systems that have registered (and perhaps authenticated) with the streaming media service. Accordingly, set-up of a given media playback system may involve registering the media playback system with one or more streaming media services, so as to provide playback device(s) of the media playback system with a source of content.

By using a social networking account to facilitate the registration of one or more streaming media services with a media playback system, example implementations described herein may reduce the number of steps involved in setting up the media playback system. For instance, in some example systems, to register a media playback system with a set of streaming media services, the user might provide log-in credentials for each streaming service, which a system might use to register itself with the service. Example techniques described herein may reduce the number of login credentials that are provided to the media playback system by using a social networking account to facilitate the registration of one or more streaming media services. This may improve the user experience, as a user might experience playback from the media playback system more quickly when such techniques are used.

Some social networking services provide an interface to associate an account of the social networking services with a respective account of one or more streaming media services. Such an association may facilitate certain social features relating to the streaming media services. For instance, after an account of a social networking service is associated with a given streaming media service, indications of songs and other media items played from the streaming media service via the respective streaming media services account may be shared on the social networking service. On a social networking service like FACEBOOK®, sharing media items might involve creating a post indicating songs played from the given streaming media service (e.g., a post that might appear on a FACEBOOK® Page, News Feed, or Timeline). As another example, on a social networking service like TWITTER®, sharing media items might involve publishing a message (e.g., a TWEET® with TWITTER®). To associate an account of the social networking services with a respective account of one or more streaming media services, a user might provide credentials for a streaming media service to the social networking service, which the social networking service can use to access the streaming service and form an association between the two accounts.

By way of such an association, a social networking account may be used to facilitate the registration of one or more streaming media services with a media playback system. During set-up, a media playback system may prompt for login credentials to a social networking service. After receiving input data indicating a login credential for a given account of the social networking service, the media playback system may query the social networking service for streaming media services that are associated with the given account of the social networking service. Upon receiving an indication of a streaming media service that is associated with the given account, the media playback system may register the streaming media service with the media playback system. After registration, playback devices of the media playback system are authorized to source media from the streaming media service.

To further reduce the set-up time from unboxing until when the user begins to experience playback from the media playback system, the playback system may populate a queue of the media playback system with one or more media items from the registered streaming media service. Moreover, the media playback system may queue particular media items in which the user has indicated interest. For instance, the system may queue media items that have been recently played or designated as favorites, among other examples. In some cases, after populating the queue, the media playback system may initiate playback of that queue.

In some implementations, to identify media items of interest, a media playback system may query the social networking service for such media items. Upon receiving such a query, the social networking service may in turn query the streaming media service(s) for media items of interest, and then relay data indicating those media items back to the media playback system. Alternatively, the social networking service may maintain its own playback history or other record of media items that the user is interested in. As noted above, songs and other media items played from the streaming media service may be shared on a social networking service, which over time, may create a record of media items that have been played. Among these items, the social networking service may indicate certain media items for the media playback system to queue (e.g., media items that were last played, or perhaps a playlist that was recently played).

In another example, a media playback system may receive data indicative of media items from a service and identify, within that data, media items to queue. For example, a streaming media service may provide (perhaps via a social networking service) raw data indicating a playback history for a particular user account. In another example, a social networking service may provide data indicating postings associated with a particular user account and the media playback system may sort or search those postings to determine which media items to queue.

As indicated above, example techniques may involve using a social networking account to facilitate the registration of one or more streaming media services with a media playback system. In one aspect, a method is provided. The method may involve displaying, on a graphical interface, a prompt for login credentials. The method may also involve detecting input data at the prompt indicating a login credential for a given account of a social networking service. The method may involve querying, via a network interface, the social networking service for streaming media services that are associated with the given account of the social networking service. The method may further involve receiving, in response to the query for streaming media services that are associated with the given account of the social networking service, data indicating a first streaming media service that is associated with the given account of the social networking service. The method may also involve registering the first streaming media service with a media playback system and populating a queue of the media playback system with one or more particular media items from the first streaming media service.

In another aspect, a device is provided. The device includes a network interface, at least one processor, a data storage, and program logic stored in the data storage and executable by the at least one processor to perform operations. The operations may include displaying, on a graphical interface, a prompt for login credentials. The operations may also include detecting input data at the prompt indicating a login credential for a given account of a social networking service. The operations may include querying, via a network interface, the social networking service for streaming media services that are associated with the given account of the social networking service. The operations may further include receiving, in response to the query for streaming media services that are associated with the given account of the social networking service, data indicating a first streaming media service that is associated with the given account of the social networking service. The operations may also include registering the first streaming media service with a media playback system and populating a queue of the media playback system with one or more particular media items from the first streaming media service.

In yet another aspect, a non-transitory computer readable memory is provided. The non-transitory computer readable memory has stored thereon instructions executable by a computing device to cause the computing device to perform operations. The operations may include displaying, on a graphical interface, a prompt for login credentials. The operations may also include detecting input data at the prompt indicating a login credential for a given account of a social networking service. The operations may include querying, via a network interface, the social networking service for streaming media services that are associated with the given account of the social networking service. The operations may further include receiving, in response to the query for streaming media services that are associated with the given account of the social networking service, data indicating a first streaming media service that is associated with the given account of the social networking service. The operations may also include registering the first streaming media service with a media playback system and populating a queue of the media playback system with one or more particular media items from the first streaming media service.

It will be understood by one of ordinary skill in the art that this disclosure includes numerous other embodiments.

While some examples described herein may refer to functions performed by given actors such as "users" and/or other entities, it should be understood that this description is for purposes of explanation only. The claims should not be interpreted to require action by any such example actor unless explicitly required by the language of the claims themselves.

This description makes use of the labels "first," "second," "third" and so on to distinguish among multiple entities of the same or similar type. For instance, reference to a "first"

streaming media service is intended to distinguish that streaming media service from streaming media services labeled "second" or "third."

II. Example Operating Environment

FIG. 1 illustrates an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
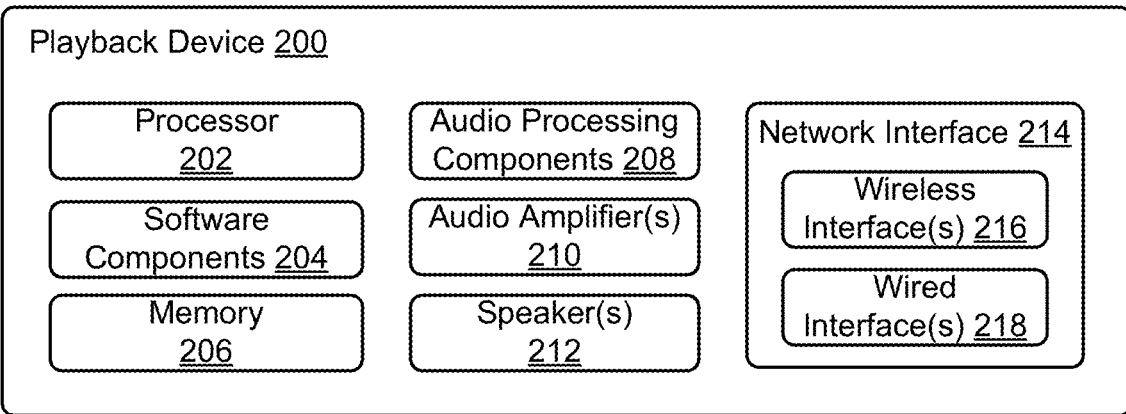
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
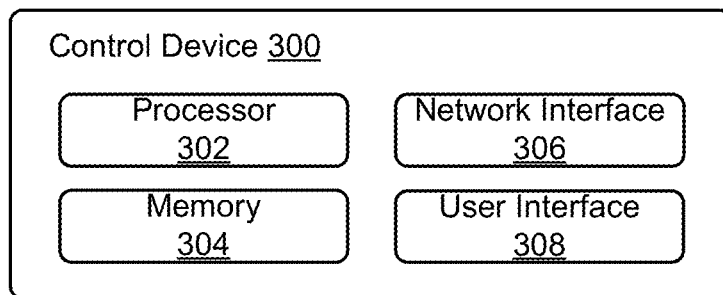
FIG. 3 shows a functional block diagram of an example control device.

FIG. 3 shows a functional block diagram of an example control device 300 that may be configured to be one or both of the control devices 126 and 128 of the media playback system 100. Control device 300 may also be referred to as a controller 300. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™)

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
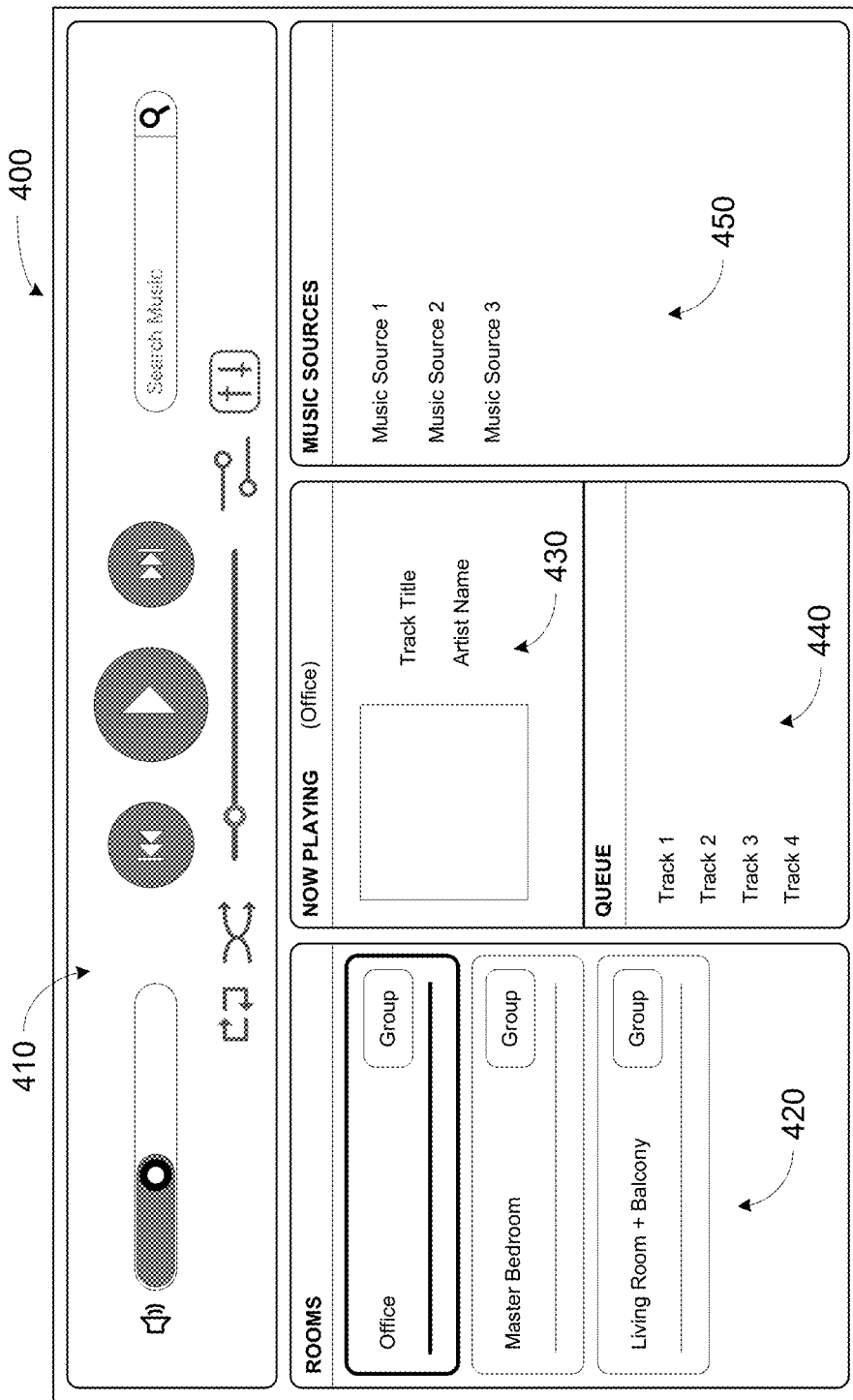
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

e. Example Cloud Computing Functions

Various references are made herein to "cloud computing." The term "cloud computing" is used to refer to services delivered using distributed computing over a network, such as the Internet. A non-exhaustive list of services delivered via the cloud include electronic mail (e.g., GMAIL® or HOTMAIL®), social networking (e.g., FACEBOOK®, LINKEDIN®, or TWITTER®), file hosting (e.g., DROPBOX®), and streaming audio (e.g., SPOTIFY®, PANDORA®, or BEATSAUDIO®). Other types and providers of cloud services are certainly available as well.

Cloud service providers may offer one or more interfaces for accessing their service over a network. For instance, some cloud services may be accessed by visiting a web site using a web browser. Other cloud services are accessed by executing a particular application specific to the cloud service on a computing device. Some cloud services may offer an application programming interface (API) to facilitate access to the service by a third-party web site or application. In some cases, cloud service providers make available multiple techniques for accessing their service. Often, a user who subscribes to (e.g., is registered with) a given cloud service can access the service from any computing device that is connected to the network, provided that the computing device has a supported interface to the cloud service (e.g., a web browser or service-specific application).

In one instance, accessing a cloud service may involve accessing, with a first computing device (i.e., a client), a second computing device or system (i.e., a server). Example client devices may include playback device 200 of FIG. 2, or control device 300 of FIG. 3, among other possible devices. One or more programs or applications (i.e., instructions) may execute on the server to perform computing operations supported by the cloud service. The client may send various commands to the server to instruct the server to perform the computing tasks supported by the cloud service.

Figure 5:
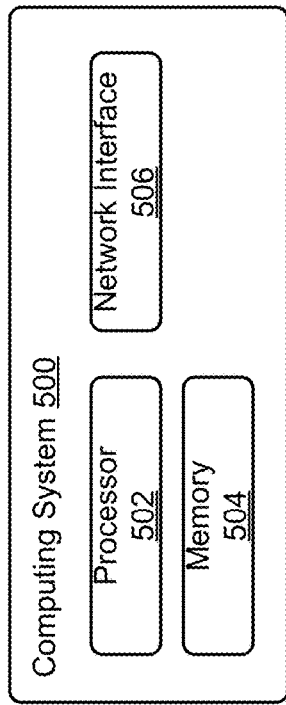
FIG. 5 shows an example computing system.

FIG. 5 illustrates an example computing system 500 that may provide a cloud service to one or more users. Example computing system 500 includes at least one processor 502, memory 504, and a network interface 506. The memory 504 may contain instructions executable by the processor 502 to perform computing tasks supported by a cloud service. The computing device 500 may communicate with other computing devices or systems via the network interface 506.

In aggregate, the provision of a cloud service many involve multiple instances of computing system 500. Each instance of computing system 500 may provide the cloud service to one or more users. Based on user demand, cloud service providers may scale the number of instances of computing system 500 involved in providing the cloud service.

Within examples, data-based representations of "user accounts" may facilitate access to a cloud service. An individual user or a group of users may create a data-based "user account," which may also be referred to simply as an "account." An account for a particular user or user group may include data related to the particular user or user group, which the user or user group has opted to provide for association with the account. As such, the account of a particular user may be in a sense a data-based representation of that particular user.

A user may create an account for various applications, web sites, and/or online services, for instance. Examples of accounts include e-mail accounts, social network accounts, online financial accounts, service provider accounts, among other possibilities. Further, in some cases, a user may have a single account that provides a data-based representation of the user for multiple services, websites, applications, etc. For instance, a user might opt to use their e-mail account or social network account as a common login for various online services and applications, which might be provided by different entities. Such a data-based representation might be available to any of the instances of the computing systems involved in providing a service so that any of the instances may provide similar access to the service when a particular account is authenticated ("logged-in") with the service.

An account may also be used with devices and systems. For instance, a user of a device, such as a mobile phone, tablet computer, or laptop computer, may associate an account with the computing device itself, such that while the account is authenticated on the computing device, the account will be authenticated with applications that are provided on the computing device. The user might also associate an account with a media playback system, such that while the account is authenticated on the media playback system, the media playback system operates according to preferences of the account.

Moreover, in some cases, a user's accounts for various services may be associated with one another. For instance, a user's account for a media playback system may be associated with the user's accounts for one or more streaming music services such that when a user's account for a media playback system is logged-in to the media playback system, the media playback system has access to the one or more streaming music services that are associated with the user's account for the media playback system.

Figure 6:
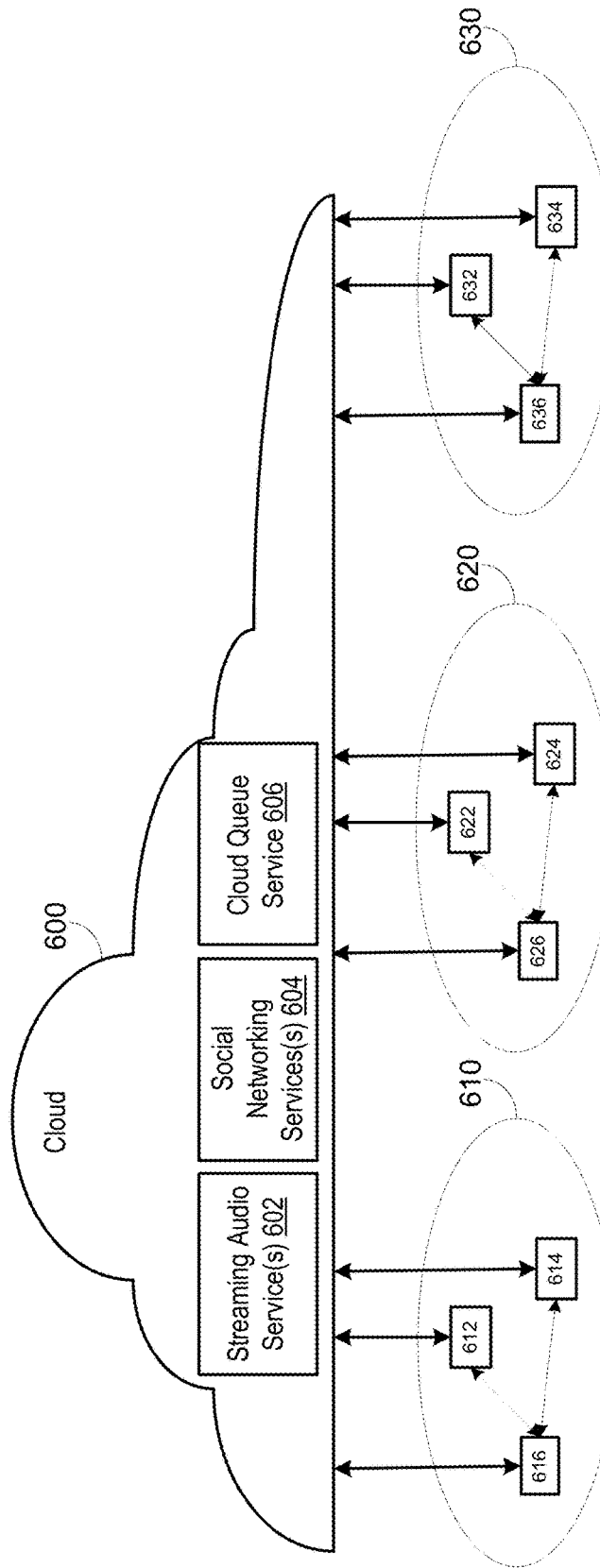
FIG. 6 shows an example cloud computing environment.

FIG. 6 illustrates an example cloud 600. The example cloud 600 may include any number of computing devices which are interconnected via one or more networks. For instance, cloud 600 may include one or more instances of computing system 500. As shown in FIG. 6, media playback systems 610, 620, and 630 are connected to cloud 600. Media playback system 610 includes playback devices 612 and 614 and control device 616, each having a respective connection to cloud 600. Likewise, media playback system 620 includes playback devices 622 and 624 and control device 626, also each having a respective connection to cloud 600. And media playback system 630 includes playback devices 632 and 634 and control device 636, also each having a respective connection to cloud 600.

Using the cloud 600, media playback systems 610, 620, and 630 may respectively access various cloud services. For instance, media playback systems 610, 620, and 630 may access one or more streaming audio services 602. As noted above, streaming audio services may provide audio content to media playback systems. Several example streaming audio services that are currently available include SPOTIFY®, PANDORA®, BEATSAUDIO®, RDIO®, GOOGLE PLAY MUSIC ALL ACCESS®, SONY MUSIC UNLIMITED®, ITUNES RADIO®, XBOX MUSIC®, and TUNEIN RADIO®. Other streaming audio services certainly exist, and other streaming audio services may be offered in the future.

Media playback systems 610, 620, and 630 may also respectively access one or more social network services 604. Social network services are often characterized at least in part by various links between users of the service (or perhaps between accounts of the service). Such links are referred to by different names, such as "friends", "connections", "followers", or "favorites," among other examples. Users may create such links for various reasons. For instance, in some cases, the users may have a relationship outside of the social network (e.g., co-workers, relatives, or friends). In other cases, two users may have similar interests (e.g., they are fans of a particular band or genre) or belong to a certain group and then form a link in the social network because they share these similar interests.

A cloud service provider may provide a cloud queue service 606. The cloud queue service 606 may maintain or have access to one or more playback queues (cloud queues). In some instances, the cloud queue service 606 may maintain playback queues for media playback systems registered with the cloud queue service 606. Such playback queues may be referred to as cloud queues. In other instances, the cloud queue service 606 may maintain multiple cloud queues for a particular media playback system, perhaps with one particular cloud queue "active" (i.e., "selected") at any instant. In further instances, the cloud queue service 606 may maintain a cloud queue that multiple media playback systems may access. One or more computing systems may be used to provide the cloud queue service 606 and to maintain the cloud queue(s) in data storage.

Various devices may access the cloud queue. Accessing the cloud queue may involve any of a variety of operations with respect to the cloud queue. For instance, some devices may access the cloud queue to modify (e.g., add, remove, or re-order) media items in a playback queue maintained by cloud queue service 606. Such devices may include control devices, such as control device 300, or any suitable device having a network interface to communicate with the cloud queue service 606. As another example, a media playback system, such as media playback systems 610 and 620, may access the cloud queue to play back the cloud queue.

Devices of a media playback system may provide control inputs that cause a device to access of the queue. For instance, a control device of a media playback system (e.g., control device 300) may provide an interface (e.g., controller interface 400) that includes various controls. The control device may detect input at such controls and responsively perform operations with respect to the cloud queue. Alternatively, a playback device of a media playback system may include various controls (e.g., buttons) that are operable to generate input data that requests various operations with respect to a cloud queue.

The above discussions relating to playback devices, controller devices, playback zone configurations, media content sources, and cloud computing provide only some examples of operating environments within which techniques described below may be implemented. Other operating environments and configurations of media playback systems, playback devices, and network devices not explicitly described herein may also be applicable and suitable for implementation of the techniques.

Figure 7:
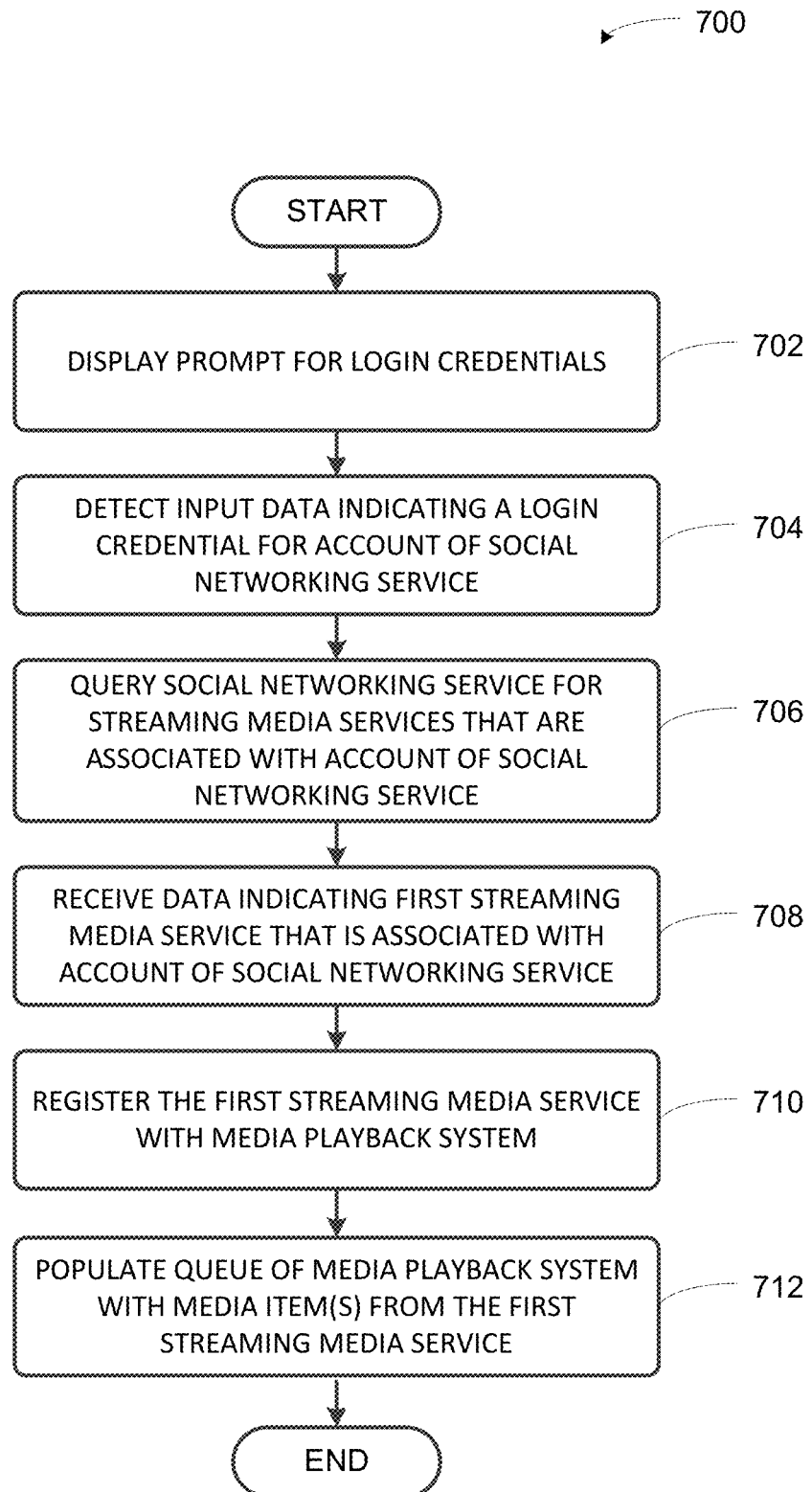
FIG. 7 shows an example flow diagram to facilitate registering streaming media service(s) with a media playback system, according to an example implementation.

III. Example Techniques to Facilitate Registration of Streaming Media Service(s) with a Media Playback System As discussed above, embodiments described herein may facilitate the registration of one or more streaming media services with a media playback system. FIG. 7 illustrates an example implementation 700 to use an account of a social networking service to facilitate the registration of one or more streaming media services with a media playback system.

Implementation 700 shown in FIG. 7 present embodiments that can be implemented within an operating environment including, for example, the media playback system 100 of FIG. 1, one or more of the playback device 200 of FIG. 2, or one or more of the control device 300 of FIG. 3. Further, operations illustrated by way of example as being performed by a media playback system can be performed by any suitable device, such as a playback device or a control device of a media playback system. Implementation 700 may include one or more operations, functions, or actions as illustrated by one or more of blocks shown in FIGS. 7. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the implementations disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementations disclosed herein, each block may represent circuitry that is wired to perform the specific logical functions in the process.

a. Display Prompt for Login Credentials

At block 702, implementation 700 involves displaying a prompt for login credentials. For instance, a control device, such as control device 126 of media playback system 100, may display an interface (e.g., control interface 400 of FIG. 4), which includes a prompt for login credentials. In some cases, a control device may display such a prompt during a set-up procedure for a media playback system. In other cases, the control device may display such a prompt upon detecting input data indicating a request to configure the media playback system (e.g., a request to configure the media playback system with one or more service providers, such as streaming media services).

Figure 8:
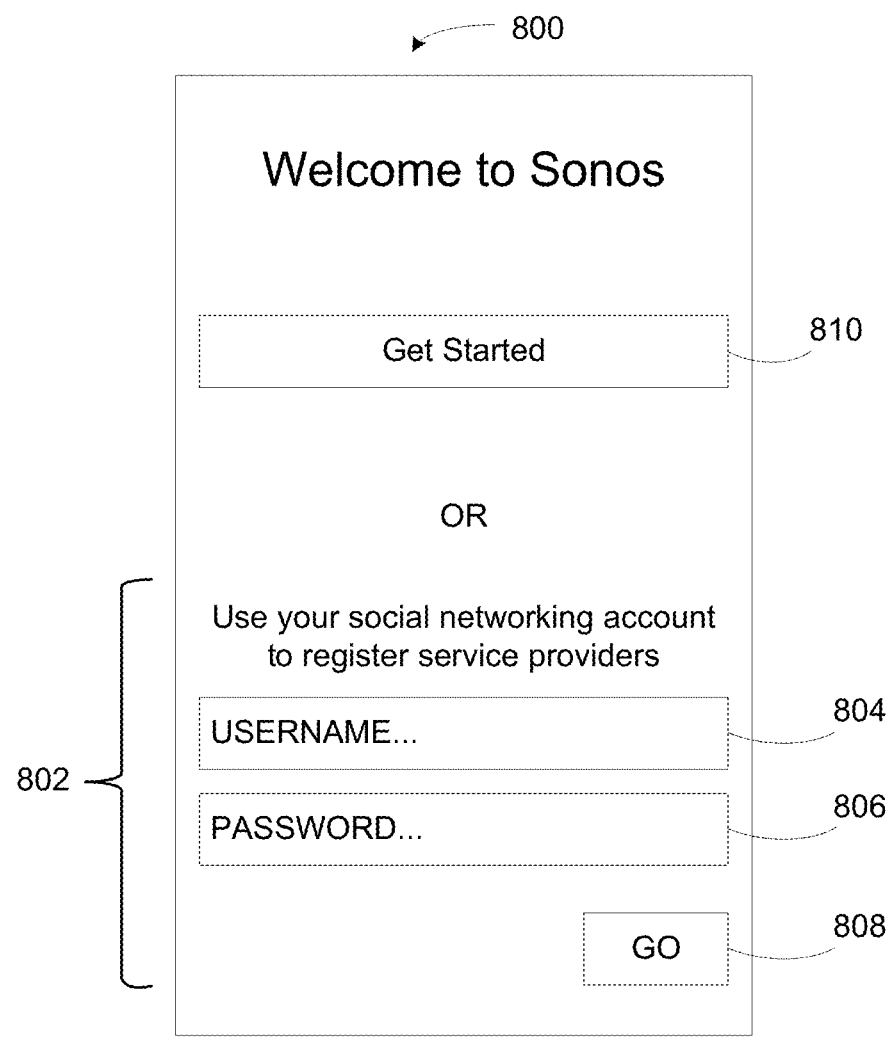
FIG. 8 shows an example controller interface, according to an example implementation.

For example, FIG. 8 illustrates an example control interface 800 that includes a graphical region 802 containing a prompt for login credentials. Graphical region 802 includes a control 804 by which a user account of a social networking service may be indicated. For instance, control 804 may be configured to accept character(s) (e.g., an email address or other username) that indicate a particular user account. Graphical region 802 also includes a control 806 by which a credential (e.g., a password) for a user account of the social networking service may be indicated. Graphical region 802 further includes selectable control 808 that, when selected, causes the control device that is displaying control interface 800 to identify the respective characters entered in control 804 and control 806.

Certain controls of control interface 800 may initiate a set-up procedure for a media playback system. For instance, selection of selectable control 808 may initiate a setup procedure that is facilitated by a given account of a social networking service, perhaps given that a user account of a social networking service is indicated in control 804 and a login credential for that user account is indicated in control 806. Control interface 800 also includes a selectable control 810. When selected, selectable control 810 initiates an alternative set-up procedure in which a media playback system is configured without necessarily using an account of a social networking service. Such a procedure may provide a set-up option to users who might not have an account with a supported social networking service or to users who opt not to use their social networking service account. Other options and examples are also possible.

In some embodiments, a social networking service may provide a prompt to initiate set-up of a media playback system. As noted above, cloud service providers (e.g., social networking services) may offer one or more interfaces for accessing their service over a network (e.g., a web interface or application). Within such an interface, a social networking service may provide a control interface for a media playback system (e.g., a control interface such as control interface 400 of FIG. 4), which may include an interface to register one or more streaming media services with a media playback system. Such embodiments might not require displaying a prompt for login credentials, as a particular user account may already be logged into the service in order to access the interface of the social networking service.

b. Detect Input Data Indicating a Login Credential for a Given Account of a Social Networking Service Referring back to FIG. 7, at block 704, implementation 700 involves detecting input data at the prompt indicating a login credential for a given account of a social networking service. For instance, a control device may detect input data at a prompt, such as graphical region 802 of FIG. 8. Such input data may indicate a login credential for a given account of a social networking service (e.g., FACEBOOK®, LINKEDIN®, or TWITTER®).

As an example, in operation, control device 126 of FIG. 1 may cause a graphical interface to display control interface 800. Control device 126 may detect a selection of selectable control 808. Upon detecting such a selection, control device 126 may identify input data (e.g., characters) indicated in controls 804 and 806. For instance, control device 126 may detect input data indicating a given user account of a social networking service in control 804 and a login credential for that user account indicated in control 806.

Within examples, input data detected at a prompt (e.g., graphical region 802) may be stored in a data storage of a control device (e.g., memory 304 of control device 300). One or more processors (e.g., processor 302) may detect input data stored in the data storage. As noted above, the input data may indicate a login credential for a given account of a social networking service.

As noted above, in some embodiments, the control device may configure the given account of the social networking service as the account of the media playback system. As noted above, an account might be associated with a media playback system, such that while the account is authenticated on the media playback system, the media playback system operates according to preferences of the account. Further, a single account may provide a data-based representation of the user for multiple services, websites, applications, etc. Within examples, a media playback system may use the given account of the social networking service as a data-based representation of the user for the media playback system.

Moreover, in some cases, an account of a social networking service may be used to access a streaming media service. For instance, a user might use her social networking service account to register with a streaming media service. In such cases, a login credential of her social networking service account may authorize access to the streaming media service. Such overlap may facilitate access to the streaming audio service from the social networking service, which may in turn facilitate certain social features relating to the streaming media service.

c. Query Social Networking Service for Streaming Media Services that are Associated with the Given Account of the Social Networking Service In FIG. 7, at block 706, implementation 700 involves querying the social networking service for streaming media services that are associated with the given account of the social networking service. For instance, a control device may send a query via a network interface to a computing system of a social networking service (e.g., computing system 500 of FIG. 5). The query may request streaming media services that are associated with the given account of the social networking service. As noted above, some social networking services provide an interface to associate an account of the social networking services with a respective account of one or more streaming media services so as to facilitate certain social features relating to the streaming media services. A query from a control device to a social networking service may request data indicating the streaming media services that have been associated with the given account of the social networking service that was indicated at a prompt, such as graphical region 802 of FIG. 8.

As another example, referring back to FIG. 6, control device 616 of media playback system 610 may query social networking service(s) 604 by sending a query over one or more networks (e.g., one or more wide area networks and possibly one or more local area networks). The query may request data indicating streaming media services (e.g., streaming audio services 602) that are associated with a given account of social networking service(s) 604.

Further, to associate an account of the social networking services with a respective account of one or more streaming media services, a login credential for a streaming media service may be provided to the social networking service, which the social networking service can use to access the streaming service. A control device may request such login credentials from the social networking service, which the control device may ultimately use to register a media playback system with the streaming media service(s).

Within examples, a social networking service may provide an application programming interface (API) that defines how entities can interact with the social networking service. Such an API may define techniques for entities to request streaming media services associated with a given account of the social network service. To query the social networking service for streaming media services that are associated with the given account, a control device may send a request that conforms to the API provided by the social networking service.

d. Receive Data Indicating a First Streaming Media Service that is Associated with the Given Account of the Social Networking Service Referring back to FIG. 7, at block 708, implementation 700 involves receiving data indicating a first streaming media service that is associated with the given account of the social networking service. For instance, a control device may receive a response to the query that requested streaming media services that are associated with the given account of the social networking service. This response may include data indicating a streaming media service (e.g., SPOTIFY®, PANDORA®, or BEATSAUDIO®) having an account that is associated with the given account of the social networking service. As another example, referring back to the example above in which control device 616 of media playback system 619 queries social networking service(s) 604, that example may continue by control device 616 receiving, from a computing system of social networking service(s) 604, data indicating a given streaming audio service (e.g., one of streaming audio services 602). In some cases, the query may return data indicating multiple streaming media services, as more than one streaming media service may be associated with the given account.

Within examples, a control device may display an interface to select the first streaming service from among streaming media services that are associated with the given account of the social networking service. In some cases, the control device may display such an interface as part of a control interface (e.g., control interface 400) for controlling a media playback system. In other cases, the control device may display this interface as part of a social networking service interface (e.g., within a web site of the social networking service or perhaps within an application of the social networking service that is configured to provide an interface). In further examples, an interface of the social networking service might be displayed within a control interface of the media playback system.

Figure 9:
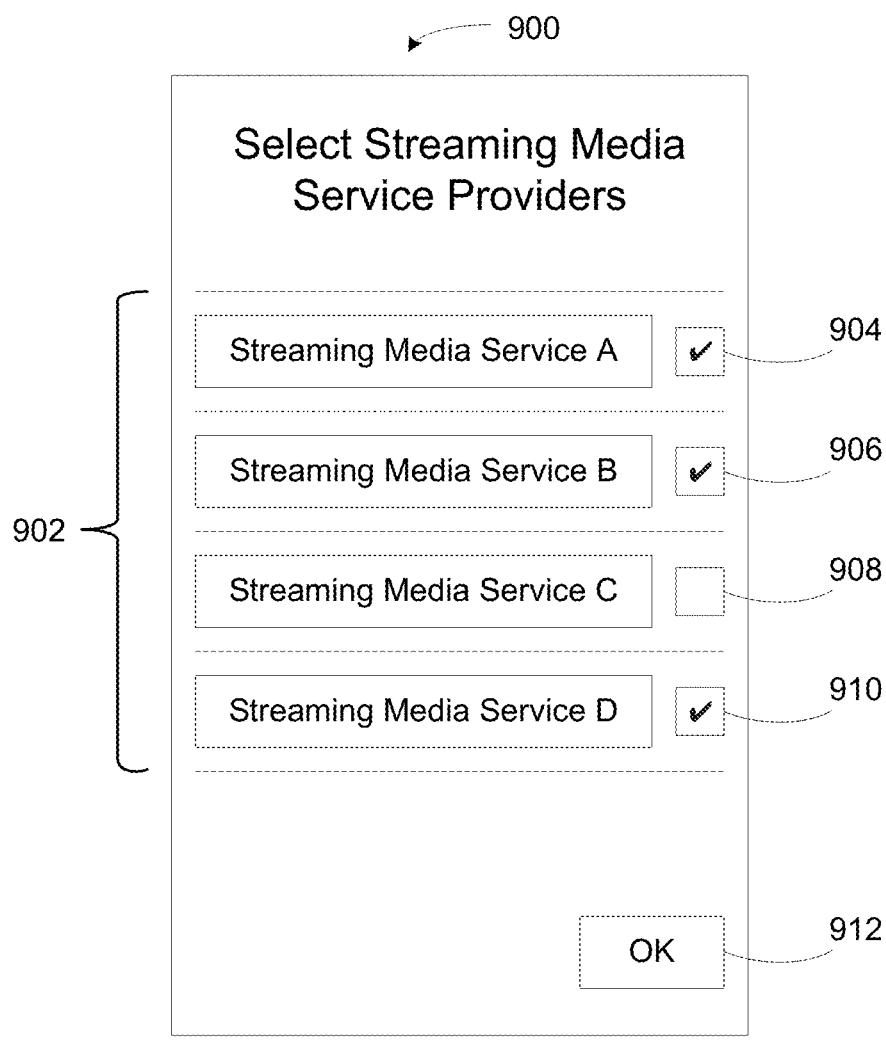
FIG. 9 shows another example controller interface, according to an example implementation.

For example, FIG. 9 illustrates an example control interface 900 to select certain streaming media services among those media streaming media services that are associated with a given account of a social networking service. A control interface such as control interface 900 may be display as part of a control interface of a media playback system (e.g., control interface 400 of FIG. 4) or as part of a control interface of a social networking service), among other examples. Control interface 900 includes a graphical region 902 containing a list of streaming media services with which a given account of a social networking service is associated. By marking in control 904, 906, 908, or 910, certain streaming media services may be selected (i.e., Streaming Media Services A-D, respectively). Upon selection of selectable control 912, a control device that is displaying control interface 900 may detect input data indicating the selected streaming media services. To illustrate, Streaming Media Services A, B, and D are shown as being selected.

e. Register the First Streaming Media Service with a Media Playback System

In FIG. 7, at block 710, implementation 700 involves registering the first streaming media service with a media playback system. For instance, a control device may register the first streaming media service with a media playback system that includes the control device and one or more playback devices. (e.g., control device 126 of FIG. 1 may register a first streaming media service with media playback system 100).

In some embodiments, registering the first streaming media service with a media playback system may involve a control device obtaining an authorization token for the first streaming media service. Such a token may authorize devices of the media playback system in their interactions with the first streaming media service (e.g., in streaming media items for playback). A control device may obtain an authorization token by sending a request for such a token to the first streaming media service. With the request, the control device may include a credential (e.g., a login credential of the social networking service or perhaps a credential of a given account of the first streaming media service), which may be a prerequisite to registering with some services.

Alternatively, registering the first streaming media service with a media playback system may involve a control device sending, to the first streaming media service, a request to register the media playback system. The first streaming media service may accept the request, and subsequently permit devices of the media playback system to access its media content.

In some cases, registering a streaming media service with a media playback system may involve obtaining additional approval in addition to the login credential. For instance, the social networking service may require that access to each streaming media service is approved prior to registering a streaming media service. To obtain such approval, a control device may display an interface by which a user may indicate approval for various streaming media services.

For example, referring back to FIG. 9, graphical region 902 of control interface 900 includes controls 904, 906, 908, and 910 by which certain streaming media services may be selected. Selecting a given service via such a control may indicate approval for a social networking service to obtain registration data (e.g., login credentials) of the selected streaming media service so as facilitate registering the selected streaming media service with the media playback system. Some social networking services might not require such additional approval, either because of design choice or perhaps because a given service provides both social networking and streaming media services (such as with TENCENT® QQ®).

Some streaming media services (or perhaps the social networking service) may require individual credentials (e.g., log-in information) to access their service. In such cases, a control device may display a prompt to provide a credential (e.g., log-in information) for the first streaming media service (and perhaps one or more additional streaming media services associated with the given account of the social networking service). Such embodiments might facilitate set-up by displaying a subset of the streaming media services supported by a given media playback system (e.g., the streaming media services associated with the given account of the social networking service, rather than all (or most) of the streaming media services supported by the media playback system).

f. Populate a Queue of the Media Playback System with Media Item(s) from the First Streaming Media Service At block 712, implementation 700 involves populating a queue of the media playback system with media item(s) from the first streaming media service. For instance, a control device may populate a queue that is maintained by one or more playback devices of the media playback system. To populate the queue, the control device may send, to a given playback device, a command to populate a queue stored on the given playback device. Alternatively, the control device may populate a queue that is maintained by a cloud queue service. To populate a cloud queue, the control device may send, to a cloud queue service, a command to populate a cloud queue stored on a server of the cloud queue service.

Along with a command to populate a given queue, a control device may indicate one or more particular media items of the first streaming media service with which to populate the queue. Within examples, populating the queue may involve sending an indication of the media items to be populated to the device or system maintaining the queue. For instance, the control device may send, to the entity maintaining the queue, URIs or URLs indicating a source from which the populated media items may be obtained. Alternatively, populating the queue may involve sending the media items themselves.

In some embodiments, a control device may query the social networking service to determine which particular media items from the streaming media service to queue. Streaming music services often have thousands or millions of different media items. A user might enjoy listening to some of these media items but might not enjoy listening to others. User experience may be improved by automatically populating the queue with media items that the user enjoys (or at least that the user is more likely to enjoy). The control device may select certain media items indicated in response to the query to populate in the queue.

As noted above, in some cases, to identify media items with which to populate the queue, a control device may query the social networking service. Songs and other media items played from the streaming media service may be shared on a social networking service, which over time, may be used to create a record of media items that have been played, when those media items were played, and how frequently those media items were played. From such a record, media items of interest to the user may be identified. For instance, the control device may query the social networking service for the last media items played (e.g., the last fifty media items played). Alternatively, control device may query the social networking service for the most frequently media items played (e.g., the twenty-five most-frequently-played media items). Other examples are possible as well.

Alternatively, the social networking service may act as a broker between the media playback system and a streaming media service so as to facilitate the media playback system identifying media items of interest from the streaming media service. A streaming media service may maintain data representing a playback history of a particular user account. In response to a query from a media playback system, a social networking service may request an indication of certain media items from the streaming media service. These media items might include the last media items played or the most frequently media items played, among other examples.

Some streaming media services support designating or saving certain media items. For instance, some media services allow media items to be "starred" which indicates an interest in the media items (e.g., that the media item is a "favorite" of the user). Further, these designated media items may be collected into a playlist by the streaming media service. To populate the queue with designated media items, a control device may query the streaming media service or perhaps the social networking service (which may broker the data from the streaming media service) for such items. Alternatively, the streaming media service may share these types of designated media items with the social networking service such that the social networking service can respond to the query by identifying such media items within the given user account.

Within a streaming media service, media items may be included in a playlist. Playlists of a streaming media service might be user-generated, be generated automatically by the service (e.g., based on song metadata), or be curated by another user. Certain playlists may become associated with a particular account of the streaming media service. For instance, recently played playlists may be marked by the service. Like with individual media items, some streaming media services may support saving certain playlists (e.g., by "following" a playlist) or designating certain playlists as favorites. A playlist that has been played recently (or played frequently), saved, or designated as a favorite is a playlist that the user is more likely to enjoy. To populate the queue with media items from such a playlist, a control device may query the streaming media service and/or the social networking service for such items.

Some streaming media services, like PANDORA® or APPLE® ITUNES RADIO®, provide streaming radio channels. In some cases, a control device may populate the queue with a recently played channel. In some cases, certain of these channels may be saved or designated as favorites within the service. A control device may populate the queue with a saved or favorited channel. To populate such a radio channel, the control device may query the streaming media service and/or the social networking service for an indication of such a channel (e.g., for data indicating a location from which the channel can be streamed).

In some cases, the control device may request the social networking service to search the given account of the social networking service for content indicating media items. Such an approach might be useful if the social networking service does not maintain a record of media items shared with the service, among other possible applications. For instance, the control device may request the social networking service to search postings made by a user account for media items mentioned in those postings. Examples include a control device requesting a search of FACEBOOK® postings that might appear on a FACEBOOK® Page, News Feed, or Timeline of a FACEBOOK® account or the control device requesting a search of TWITTER® TWEETS® published by a TWITTER® account, among other examples.

Moreover, social data may further distinguish certain media items as candidates to populate in the queue. For instance, a posting that indicates a certain media item or playlist and receives relatively more attention from other users of the social networking service (e.g., relatively more comments, FACEBOOK® Likes, or TWITTER® Retweets) may indicate a media item or playlist of media items that the user is more likely to have an interest in.

In some embodiments, a control device may populate certain media items so as to pick up from where a user stopped listening. For instance, the control device may query a social networking service or streaming media service for a container (e.g., an album or playlist) that was last played. Further, the control device may request an indication of the particular media item within that container that was last played. To pick up from where a user stopped listening to this container, the control device may populate the queue with media items from that album or playlist. The control device may then initiate playback of the populated queue beginning with the particular media item within the queued container that was last played or perhaps beginning with the media item listed subsequent to the media item within the queued container that was last played.

Within examples, a given media playback system might not support all of the streaming media services that are associated with the given account of the social networking service. In some cases, populating the queue with media items from an unsupported streaming media services may improve user experience, as such media items might be likely to be enjoyed by the user (perhaps because they were played more frequently than other media items). However, the control system might not be able to queue media items from an unsupported media service. To queue these media items, the control device may query a supported streaming media service for media items that are equivalent to the media items from the unsupported media service. In some cases, the same media items are available from two or more services, so the control device may queue the same media items from the unsupported service, but from a registered (and supported) service.

In some cases, a control device may repeat certain operations of implementation 700 for one or more additional streaming media services, so as to register those additional streaming media service(s) with the media playback system. For instance, the query for streaming media services that are associated with the given account of the social networking service may return one or more streaming media services in addition to the first streaming media service (e.g., a second streaming media service).

The control device may register this second streaming media service with the media playback system. Further, the control device may populate the queue of the media playback system with one or more particular media items from the second streaming media service. In some cases, the populated queue may include one or more media items from the first streaming media service and one or more media items from the second streaming media service (and possibly media items from additional streaming media services as well).

Alternatively, in cases where multiple streaming services are registered with the media playback system, a media playback system may choose among the multiple streaming media services to identify media items to populate in the queue. Within example, the media playback system may populate media items from the streaming media service that was last accessed (e.g., a control device may populate a playlist that was last played, or that was paused partway through playback). As another example, the media playback system may populate media items from the streaming media service that is most frequently accessed (e.g., the streaming media service that is most frequently accessed within the past week, or some other suitable timeframe). Other examples are possible as well.

A control device may perform certain operations upon detecting input data at the prompt indicating a login credential for a given account of a social networking service (or perhaps upon detecting input data indicating approval to register a particular streaming media service). For example, responsive to such input data, the control device may (i) query a social networking service, (ii) register one or more streaming media services with a media playback system, and (iii) populate a queue of the media playback system with one or more media items from the registered streaming media service(s). From a user's perspective, such operations may appear to automatically queue media items after the input data is entered, which may improve user experience during set-up or configuration of the media playback system.

In some embodiments, after populating the queue, the control device may direct one or more playback devices to initiate playback of the populated queue. Such an operation may further improve user experience, as the user may begin listening to music from the media playback system sooner after unboxing. In cases in which the media playback system includes multiple playback devices, the control device may direct two or more of the playback devices to jointly play back the queue (e.g., in synchrony).

Because in some embodiments playback of the populated queue may occur automatically, without further user interaction, such playback may, in some circumstances, be unexpected (and possibly undesired). For instance, one member of a household might be setting up a media playback system while another member of the household is sleeping. In such a circumstance, automatic playback of the populated queue may be unwanted, since such playback might wake the sleeping member of the household.

To avoid such issues, in some embodiments, the control device might not automatically direct the playback device(s) to initiate playback of the populated queue. Instead, upon populating the queue of the control device may display a selectable play control that, when selected, directs the playback device(s) to initiate playback of the populated queue. Alternatively, the control device may automatically direct the playback device(s) to initiate playback of the populated queue, and also display a selectable pause control that, when selected, pauses the initiated payback of the populated queue by the at least one playback device (e.g., a selectable control of a playback control region, such as playback control region 410 of FIG. 4). By way of such a control, undesired playback may be quickly stopped.

In some configurations, the playback devices of a media playback system may be divided into two or more zones (e.g., the zones of media playback system 100 of FIG. 1). Each zone may have a respective queue from which playback devices of the zone play back media items. Among the respective queues of the multiple zones, a control device may identify a particular one of the queues to populate.

In some embodiments, the control device may determine that the control device is located in proximity to a particular zone and, based on that determination, populate the queue of that zone. For instance, control device 126 may determine that it is in proximity to playback device 104 of the Living Room zone and responsively populate the queue of the Living Room zone. Alternatively, the control device may determine that a particular zone was last used, and, based on that determination, populate the queue of that zone. For example, a control interface associated with that particular zone may be displayed on the control device, which may indicate that the particular zone was the zone last controlled by the control device. As a third example, a control device may display a control interface that includes controls to select a particular zone and populate the queue of the selected zone. Other examples are possible as well.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, example techniques may involve using a social networking account to facilitate the registration of one or more streaming media services with a media playback system. In one aspect, a method is provided. The method may involve displaying, on a graphical interface, a prompt for login credentials. The method may also involve detecting input data at the prompt indicating a login credential for a given account of a social networking service. The method may involve querying, via a network interface, the social networking service for streaming media services that are associated with the given account of the social networking service. The method may further involve receiving, in response to the query for streaming media services that are associated with the given account of the social networking service, data indicating a first streaming media service that is associated with the given account of the social networking service. The method may also involve registering the first streaming media service with a media playback system and populating a queue of the media playback system with one or more particular media items from the first streaming media service.

In another aspect, a device is provided. The device includes a network interface, at least one processor, a data storage, and program logic stored in the data storage and executable by the at least one processor to perform operations. The operations may include displaying, on a graphical interface, a prompt for login credentials. The operations may also include detecting input data at the prompt indicating a login credential for a given account of a social networking service. The operations may include querying, via a network interface, the social networking service for streaming media services that are associated with the given account of the social networking service. The operations may further include receiving, in response to the query for streaming media services that are associated with the given account of the social networking service, data indicating a first streaming media service that is associated with the given account of the social networking service. The operations may also include registering the first streaming media service with a media playback system and populating a queue of the media playback system with one or more particular media items from the first streaming media service.

In yet another aspect, a non-transitory computer readable memory is provided. The non-transitory computer readable memory has stored thereon instructions executable by a computing device to cause the computing device to perform operations. The operations may include displaying, on a graphical interface, a prompt for login credentials. The operations may also include detecting input data at the prompt indicating a login credential for a given account of a social networking service. The operations may include querying, via a network interface, the social networking service for streaming media services that are associated with the given account of the social networking service. The operations may further include receiving, in response to the query for streaming media services that are associated with the given account of the social networking service, data indicating a first streaming media service that is associated with the given account of the social networking service. The operations may also include registering the first streaming media service with a media playback system and populating a queue of the media playback system with one or more particular media items from the first streaming media service.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A controller device comprising:
   at least one processor;
   a tangible, non-transitory computer-readable memory; and
   program instructions stored in the tangible, non-transitory computer-readable memory, wherein the program instructions, when executed by the at least one processor, configure the controller device to:
   receive, via a graphical user interface of the controller device, a selection of one or more streaming media services associated with a social network account of a social networking service;
   after receiving a selection of a first streaming media service of the one or more streaming media services associated with the social network account, receive, from the social networking service, data associated with login credentials for the first streaming media service associated with the social network account;
   after receiving the data associated with the login credentials for the first streaming media service associated with the social network account from the social networking service, use the data associated with the login credentials for the first streaming media service associated with the social network account to configure one or more playback devices of a media playback system to play back audio content from the first streaming media service associated with the social network account, wherein the one or more media playback devices are separate from the controller device; and
   after configuring the one or more playback devices to play back audio content from the first streaming media service, send one or more instructions from the controller device to the one or more playback devices that cause the one or more playback devices to play back first audio content from the first streaming media service.

2. The controller device of claim 1, wherein the program instructions that, when executed by the at least one processor, configure the controller device to configure the one or more playback devices of the media playback system to play back audio content from the first streaming media service associated with the social network account comprise program instructions that, when executed by the at least one processor, configure the controller device to configure the one or more playback devices to synchronously play back audio content from the first streaming media service with another playback device.

3. The controller device of claim 1, wherein the program instructions that, when executed by the at least one processor, configure the controller device to send one or more instructions from the controller device to the one or more playback devices that cause the one or more playback devices to play back first audio content from the first streaming media service comprise program instructions that, when executed by the at least one processor, configure the controller device to:
   after configuring the one or more playback devices to play back audio content from the first streaming media service, populate a queue for the one or more playback devices with one or more media items from the first streaming media service; and cause the one or more playback devices to play back one or more media items from the queue.

4. The controller device of claim 3, wherein the program instructions that, when executed by the at least one processor, configure the controller device to send one or more instructions from the controller device to the one or more playback devices that cause the one or more playback devices to play back first audio content from the first streaming media service comprise program instructions that, when executed by the at least one processor, configure the controller device to:

after populating the queue, display, via the graphical user interface, a selectable play control that, when selected, directs the one or more playback devices to initiate play back of the populated queue.

5. The controller device of claim 3, wherein the program instructions that, when executed by the at least one processor, configure the controller device to send one or more instructions from the controller device to the one or more playback devices that causes the one or more playback devices to play back first audio content from the first streaming media service comprise program instructions that, when executed by the at least one processor, configure the controller device to:

after populating the queue, initiate the one or more playback devices to play back the queue; and display, via the graphical user interface, a selectable pause control that, when selected, directs the one or more playback devices to pause the initiated play back of the populated queue.

6. The controller device of claim 1, wherein the program instructions further comprise program instructions that, when executed by the at least one processor, configure the controller device to:

after receiving, via the graphical user interface of the controller device, data indicating login credentials for the social network account of the social networking service associated with one or more streaming media services, store the data indicating the login credentials for the social network account of the social networking service.

7. The controller device of claim 1, wherein the program instructions further comprise program instructions that, when executed by the at least one processor, configure the controller device to:

display, via the graphical user interface, selectable representations of the first streaming media service and a second streaming media service associated with the social network account;

after receiving a selection of the second streaming media service associated with the social network account, receive, from the social networking service, data associated with login credentials for the second streaming media service associated with the social network account and after receiving the data associated with the login credentials for the second streaming media service associated with the social network account from the social networking service, use the data associated with the login credentials for the second streaming media service associated with the social network account to configure the one or more playback devices of the media playback system to play back audio content from the second streaming media service associated with the social network account.

8. A method comprising:

receiving, via a graphical user interface of a controller device, a selection of one or more streaming media services associated with a social network account of a social networking service;

after receiving a selection of a first streaming media service of the one or more streaming media services associated with the social network account, receiving, by the controller device, from the social networking service, data associated with login credentials for the first streaming media service associated with the social network account;

after receiving the data associated with the login credentials for the first streaming media service associated with the social network account from the social networking service, using the data associated with the login credentials for the first streaming media service associated with the social network account to configure, by the controller device, one or more playback devices of a media playback system to play back audio content from the first streaming media service associated with the social network account, wherein the one or more media playback devices are separate from the controller device; and after configuring the one or more playback devices to play back audio content from the first streaming media service, sending, from the controller device, one or more instructions to the one or more playback devices that cause the one or more playback devices to play back first audio content from the first streaming media service.

9. The method of claim 8, wherein configuring, by the controller device, one or more playback devices of a media playback system to play back audio content from the first streaming media service associated with the social network account comprises configuring, by the controller device, the one or more playback devices to synchronously play back audio content from the first streaming media service with another playback device.

10. The method of claim 9, wherein sending, from the controller device, one or more instructions from the controller device to the one or more playback devices that cause the one or more playback devices to play back first audio content from the first streaming media service comprises:

after configuring the one or more playback devices to play back audio content from the first streaming media service, populating a queue of the one or more playback devices with one or more media items from the first streaming media service; and causing the one or more playback devices to play back one or more media items from the queue.

11. The method of claim 10, wherein sending, from the controller device, one or more instructions to the one or more playback devices that cause the one or more playback devices to play back first audio content from the first streaming media service comprises:

after populating the queue, displaying, via the graphical user interface of the controller device, a selectable play control that, when selected, directs the one or more playback devices to initiate play back of the populated queue.

12. The method of claim 10, wherein sending, from the controller device, one or more instructions to the one or more playback devices that cause the one or more playback devices to play back first audio content from the first streaming media service comprises:

after populating the queue, initiating, by the controller device, the one or more playback devices to play back the queue; and displaying, via the graphical user interface of the controller device, a selectable pause control that, when selected, directs the one or more playback devices to pause the initiated play back of the populated queue.

13. The method of claim 8, wherein the method further comprises:

after receiving, via the graphical user interface of the controller device, data indicating login credentials for the social network account of the social networking service associated with one or more streaming media services, storing, by the controller device, the data indicating the login credentials for the social network account of the social networking service.

14. The method of claim 8, wherein the method further comprises:

displaying, via the graphical user interface of the controller device, selectable representations of the first streaming media service and a second streaming media service associated with the social network account;

after receiving a selection of the second streaming media service associated with the social network account, receiving, from the social networking service, data associated with login credentials for the second streaming media service associated with the social network account; and after receiving the data associated with the login credentials for the second streaming media service associated with the social network account from the social networking service, using the data associated with the login credentials for the second streaming media service associated with the social network account to configure the one or more playback devices of the media playback system to play back audio content from the second streaming media service associated with the social network account.

15. Tangible, non-transitory computer-readable media having stored therein instructions executable by one or more processors, wherein the instructions, when executed by the one or more processors, cause a controller device to perform functions comprising:

receiving, via a graphical user interface of the controller device, a selection of one or more streaming media services, wherein each of the one or more streaming media services is associated with a social network account of a social networking service;

after receiving a selection of a first streaming media service of the one or more streaming media services associated with the social network account, receiving, from the social networking service, a data associated with login credentials for the first streaming media service associated with the social network account;

after receiving the data associated with the login credentials for the first streaming media service associated with the social network account from the social networking service, using the data associated with the login credentials for the first streaming media service associated with the social network account to configure one or more playback devices of a media playback system to play back audio content from the first streaming media service associated with the social network account, wherein the one or more media playback devices are separate from the controller device; and after configuring the one or more playback devices to play back audio content from the first streaming media service, sending one or more instructions from the controller device to the one or more playback devices that cause the one or more playback devices to play back first audio content from the first streaming media service.

16. The tangible, non-transitory computer-readable media of claim 15, wherein configuring the one or more playback devices of the media playback system to play back audio content from the first streaming media service associated with the social network account comprises configuring the one or more playback devices to synchronously play back audio content from the first streaming media service with another playback device.

17. The tangible, non-transitory computer-readable media of claim 15, wherein sending one or more instructions from the controller device to the one or more playback devices that cause the one or more playback devices to play back first audio content from the first streaming media service comprises:

after configuring the one or more playback devices to play back audio content from the first streaming media service, populating a queue of the one or more playback devices with one or more media items from the first streaming media service; and causing the one or more playback devices to play back one or more media items from the queue.

18. The tangible, non-transitory computer-readable media of claim 17, wherein sending one or more instructions from the controller device to the one or more playback devices that cause the one or more playback devices to play back first audio content from the first streaming media service comprises:

after populating the queue, displaying, via the graphical user interface, a selectable play control that, when selected, directs the one or more playback devices to initiate play back of the populated queue.

19. The tangible, non-transitory computer-readable media of claim 17, wherein sending one or more instructions from the controller device to the one or more playback devices that cause the one or more playback devices to play back first audio content from the first streaming media service comprises:

after populating the queue, initiating the one or more playback devices to play back the queue; and displaying, via the graphical user interface, a selectable pause control that, when selected, directs the one or more playback devices to pause the initiated play back of the populated queue.

20. The tangible, non-transitory computer-readable media of claim 17, wherein the functions further comprise:

after receiving, via the graphical user interface of the controller device, data indicating login credentials for the social network account of the social networking service associated with one or more streaming media services, storing the data indicating the login credentials for the social network account of the social networking service.

\* \* \* \* \*